United States Patent
Bramlett, Jr. et al.

(10) Patent No.: US 9,471,892 B2
(45) Date of Patent: Oct. 18, 2016

(54) SYSTEM AND METHOD FOR EMBEDDING REPORT DESCRIPTORS INTO AN XML STRING TO ASSURE REPORT CONSISTENCY

(71) Applicant: PROFILES INTERNATIONAL LLC, Waco, TX (US)

(72) Inventors: William L. Bramlett, Jr., Tolar, TX (US); Brian C. Giedt, Waco, TX (US)

(73) Assignee: PROFILES INTERNATIONAL, INC., Waco, TX (US)

( * ) Notice: Subject to any disclaimer, the term of this patent is extended or adjusted under 35 U.S.C. 154(b) by 290 days.

(21) Appl. No.: 14/196,377

(22) Filed: Mar. 4, 2014

(65) Prior Publication Data
US 2014/0278831 A1 Sep. 18, 2014

Related U.S. Application Data

(60) Provisional application No. 61/784,054, filed on Mar. 14, 2013.

(51) Int. Cl.
 *G06F 17/20* (2006.01)
 *G06Q 10/06* (2012.01)

(52) U.S. Cl.
 CPC ........ *G06Q 10/06398* (2013.01); *G06Q 10/06* (2013.01)

(58) Field of Classification Search
 CPC .................................................... G06Q 10/06
 USPC .................. 705/7.14; 707/738; 715/771
 See application file for complete search history.

(56) References Cited

U.S. PATENT DOCUMENTS

| | | | | |
|---|---|---|---|---|
| 5,551,880 | A * | 9/1996 | Bonnstetter | G09B 7/02 434/236 |
| 6,510,031 | B1 * | 1/2003 | Gambino | B82Y 10/00 360/324 |
| 6,638,171 | B1 * | 10/2003 | Igarashi | A63F 13/10 463/31 |
| 6,925,443 | B1 * | 8/2005 | Baggett, Jr. | G06F 21/577 705/1.1 |
| 7,080,057 | B2 * | 7/2006 | Scarborough | G06Q 10/063 706/12 |
| 7,249,372 | B1 * | 7/2007 | Bonnstetter | G06Q 10/10 705/51 |
| 7,346,889 | B1 * | 3/2008 | Semenov | G06F 8/51 717/106 |
| 7,555,495 | B2 * | 6/2009 | Chu | G06Q 10/06 |
| 7,636,902 | B1 * | 12/2009 | Crittenden | G06Q 10/00 707/999.001 |
| 7,752,035 | B2 * | 7/2010 | Oon | G06F 17/241 704/9 |
| 7,769,565 | B2 * | 8/2010 | Fujita | G01N 35/00722 702/187 |
| 7,778,938 | B2 * | 8/2010 | Stimac | G06Q 10/10 705/321 |

(Continued)

*Primary Examiner* — Mohammed-Ibrahim Zuberi
(74) *Attorney, Agent, or Firm* — Dorsey & Whitney LLP

(57) ABSTRACT

A system stores report descriptors. The report descriptors are used in sections of reports. The reports include a report type and subject. The system generates a pseudo random number seed for use in selecting a first subset of the report descriptors for the reports on a first report subject, and stores the pseudo random number seed. The system retrieves the first subset of report descriptors for the reports on the first report subject based on the pseudo random number seed and subsequently generated random numbers, places the retrieved first subset of report descriptors into an XML string, and generates two or more reports relating to the first report subject using the first subset of report descriptors in the XML string. The two or more reports include at least two different report types, and each common section among the two or more reports includes the same report descriptors.

17 Claims, 10 Drawing Sheets

(56) References Cited

U.S. PATENT DOCUMENTS

| | | | | |
|---|---|---|---|---|
| 7,801,921 B2* | 9/2010 | Gillespie | G06F 17/30377 | 707/796 |
| 7,805,382 B2* | 9/2010 | Rosen | G06Q 10/10 | 705/321 |
| 7,818,282 B2* | 10/2010 | Blackwell | G06F 9/4448 | 704/1 |
| 7,974,981 B2* | 7/2011 | Zhao | G06F 17/30595 | 707/769 |
| 8,019,687 B2* | 9/2011 | Wang | G06F 21/10 | 705/51 |
| 8,171,451 B2* | 5/2012 | Boland | G06F 17/3089 | 709/206 |
| 8,200,505 B2* | 6/2012 | Walker | G06F 17/2247 | 705/2 |
| 8,458,202 B2* | 6/2013 | Noumeir | G06F 19/321 | 707/756 |
| 8,479,158 B2* | 7/2013 | Chen | G06F 11/1471 | 717/117 |
| 8,484,560 B2* | 7/2013 | Vuong | G06F 17/212 | 715/253 |
| 8,515,779 B2* | 8/2013 | Lopez | G06Q 50/24 | 705/2 |
| 8,645,861 B2* | 2/2014 | Rumak | G06F 19/366 | 715/810 |
| 8,655,843 B2* | 2/2014 | Felt | G06F 19/322 | 707/636 |
| 8,745,486 B2* | 6/2014 | Cristache | G06F 17/217 | 715/243 |
| 8,775,218 B2* | 7/2014 | Burgoon, Jr. | G06Q 50/22 | 705/4 |
| 8,893,120 B2* | 11/2014 | Pinsky | G06F 17/212 | 717/174 |
| 8,904,273 B2* | 12/2014 | Ferguson | G06F 17/218 | 715/202 |
| 2002/0002325 A1* | 1/2002 | Iliff | G06Q 50/22 | 600/300 |
| 2002/0007123 A1* | 1/2002 | Balas | A61B 1/303 | 600/476 |
| 2003/0163049 A1* | 8/2003 | Balas | A61B 1/303 | 600/476 |
| 2004/0014016 A1* | 1/2004 | Popeck | G09B 7/02 | 434/322 |
| 2004/0166942 A1* | 8/2004 | Muir | G06Q 20/346 | 463/43 |
| 2004/0190624 A1* | 9/2004 | Kondo | H04N 7/0112 | 375/240.16 |
| 2006/0080128 A1* | 4/2006 | Brown | G06Q 10/00 | 705/321 |
| 2006/0135859 A1* | 6/2006 | Iliff | G06F 19/3406 | 600/300 |
| 2007/0016018 A1* | 1/2007 | Kinicki | G01S 7/52084 | 600/437 |
| 2009/0192836 A1* | 7/2009 | Kelly | G06Q 30/0203 | 705/7.32 |
| 2012/0116845 A1* | 5/2012 | Warta | G06Q 30/06 | 705/7.32 |
| 2013/0030260 A1* | 1/2013 | Hale | G06F 19/3431 | 600/301 |
| 2014/0207694 A1* | 7/2014 | Vickery | G06Q 50/26 | 705/317 |
| 2015/0278768 A1* | 10/2015 | Boring | G06Q 10/1053 | 705/321 |

* cited by examiner

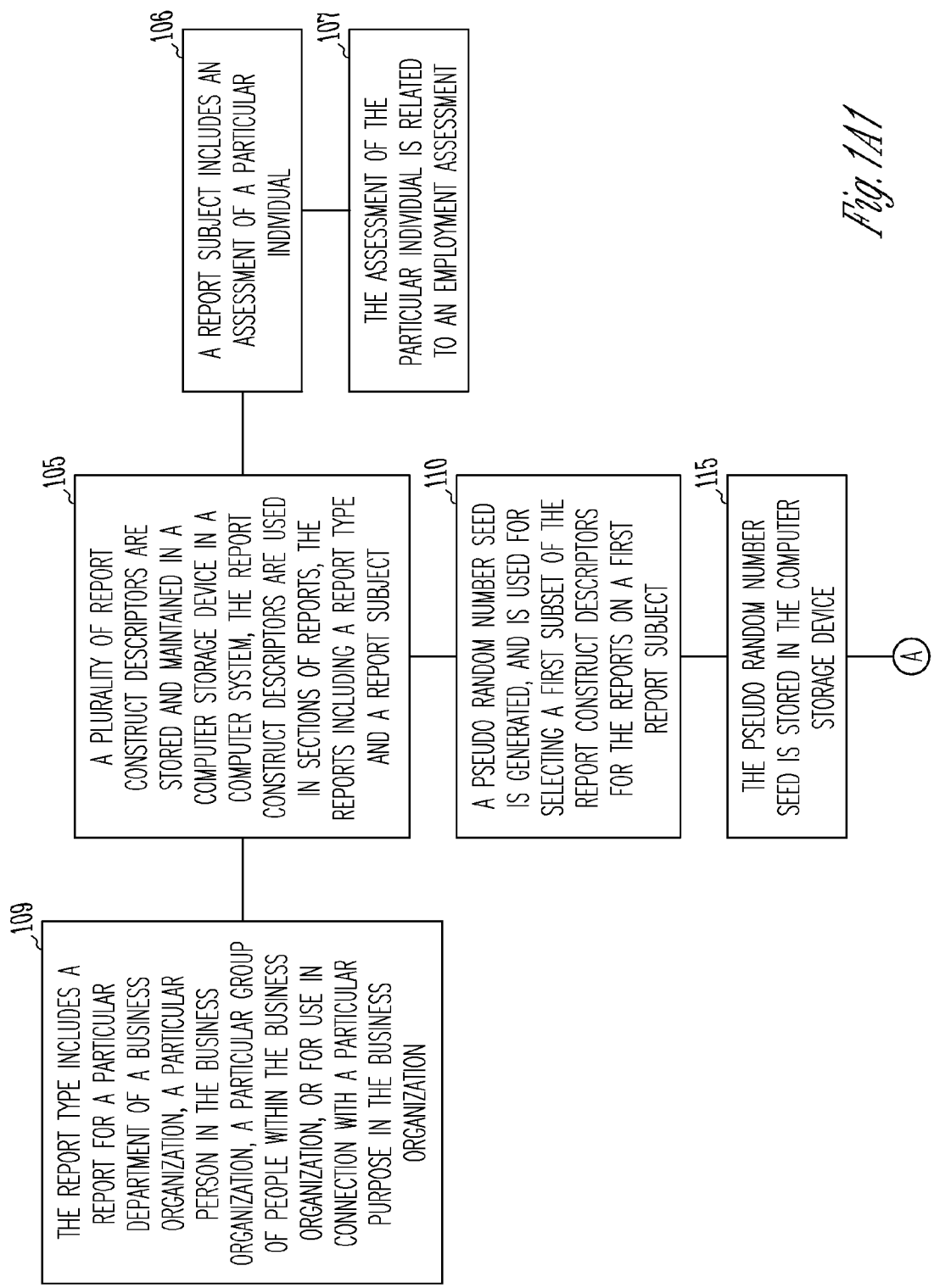
Fig. 1A1

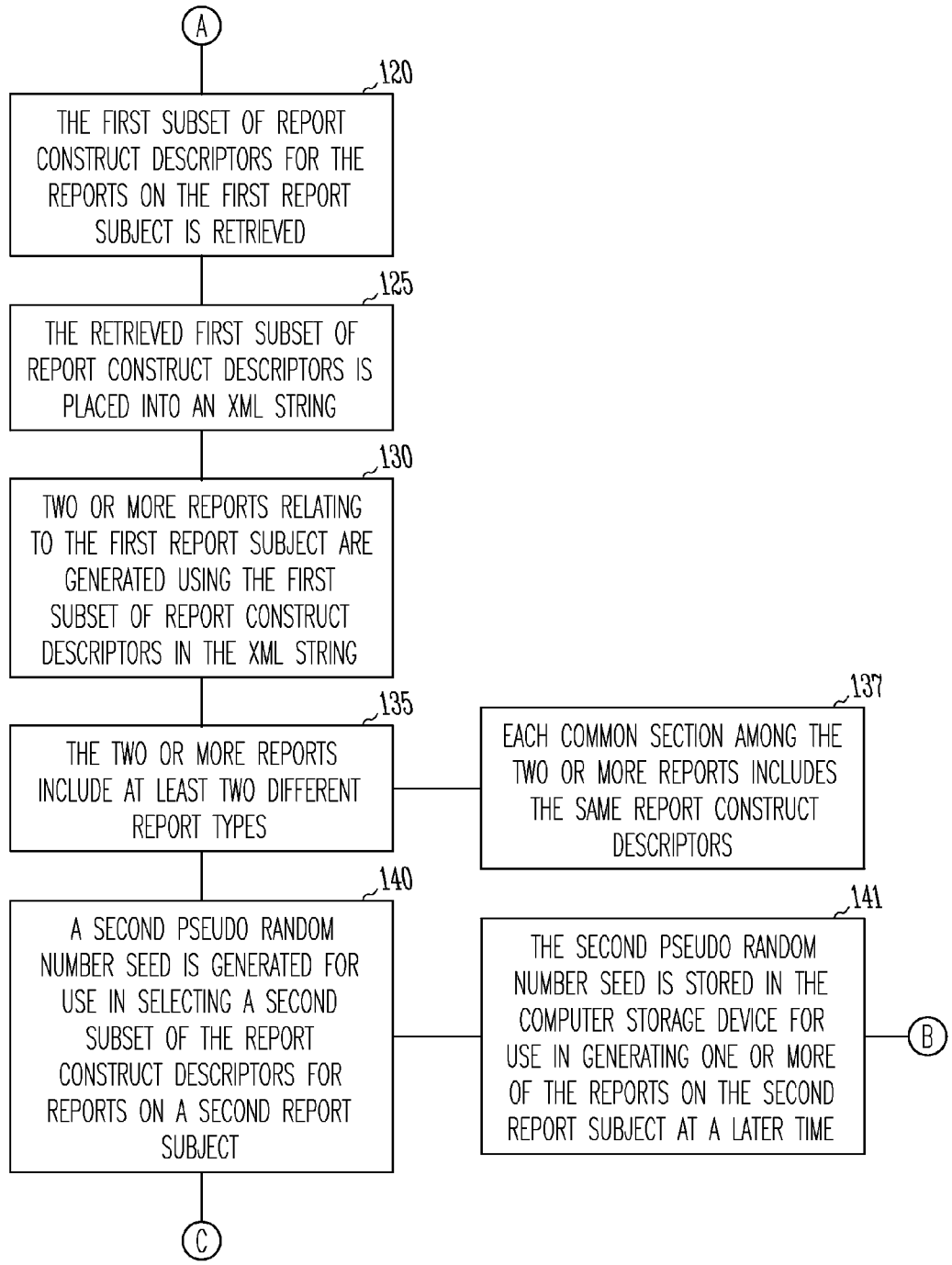
Fig. 1A2

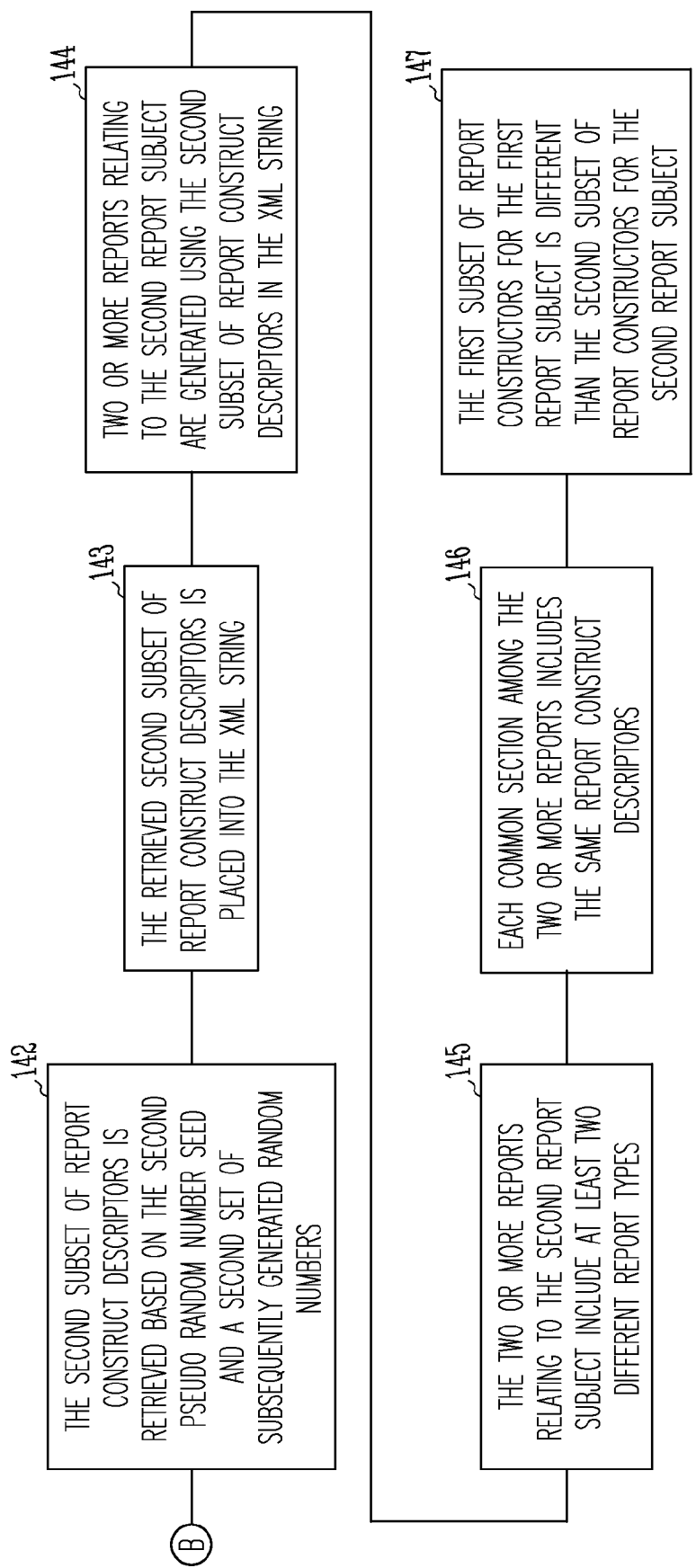
Fig. 1A3

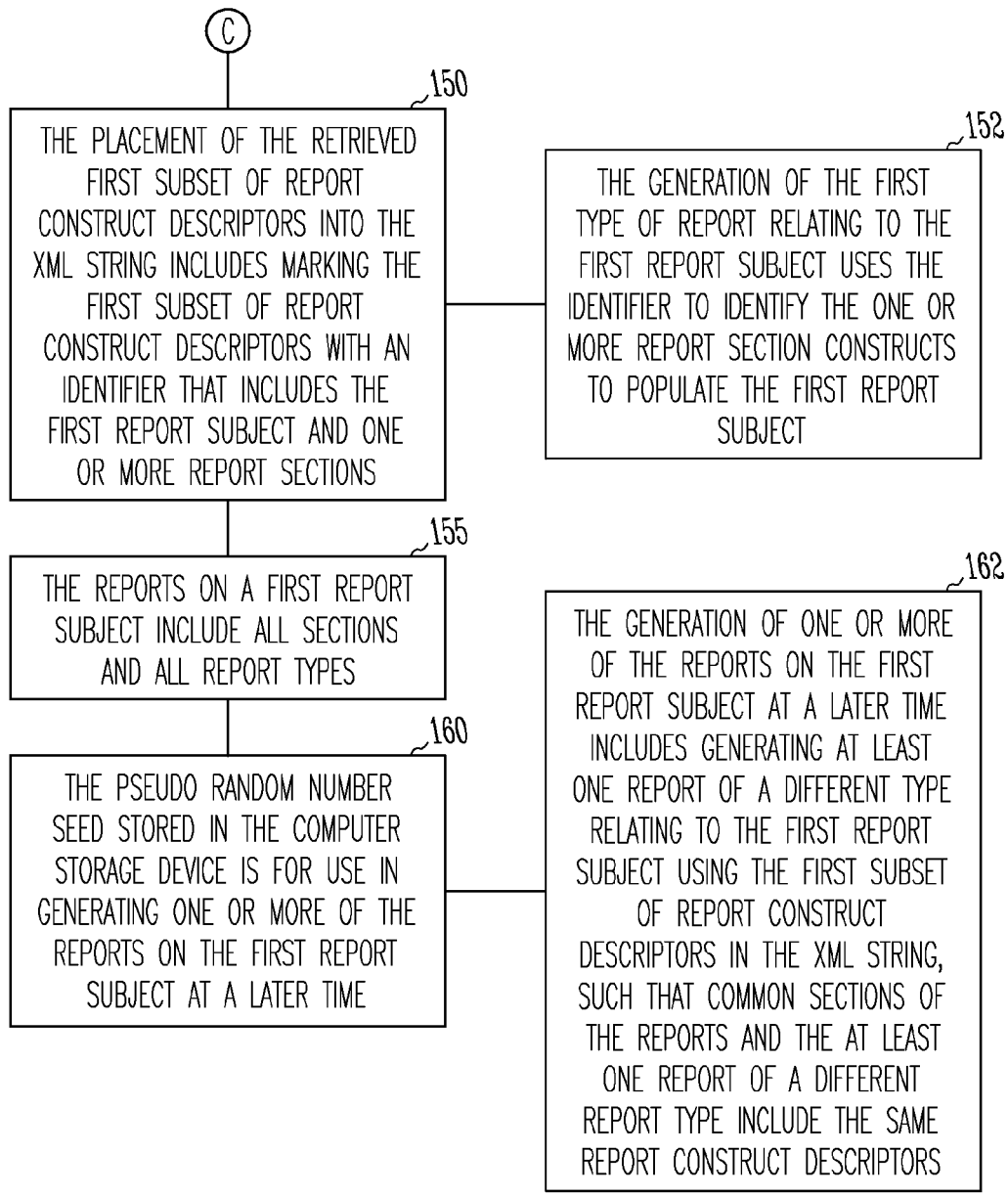
Fig. 1A4

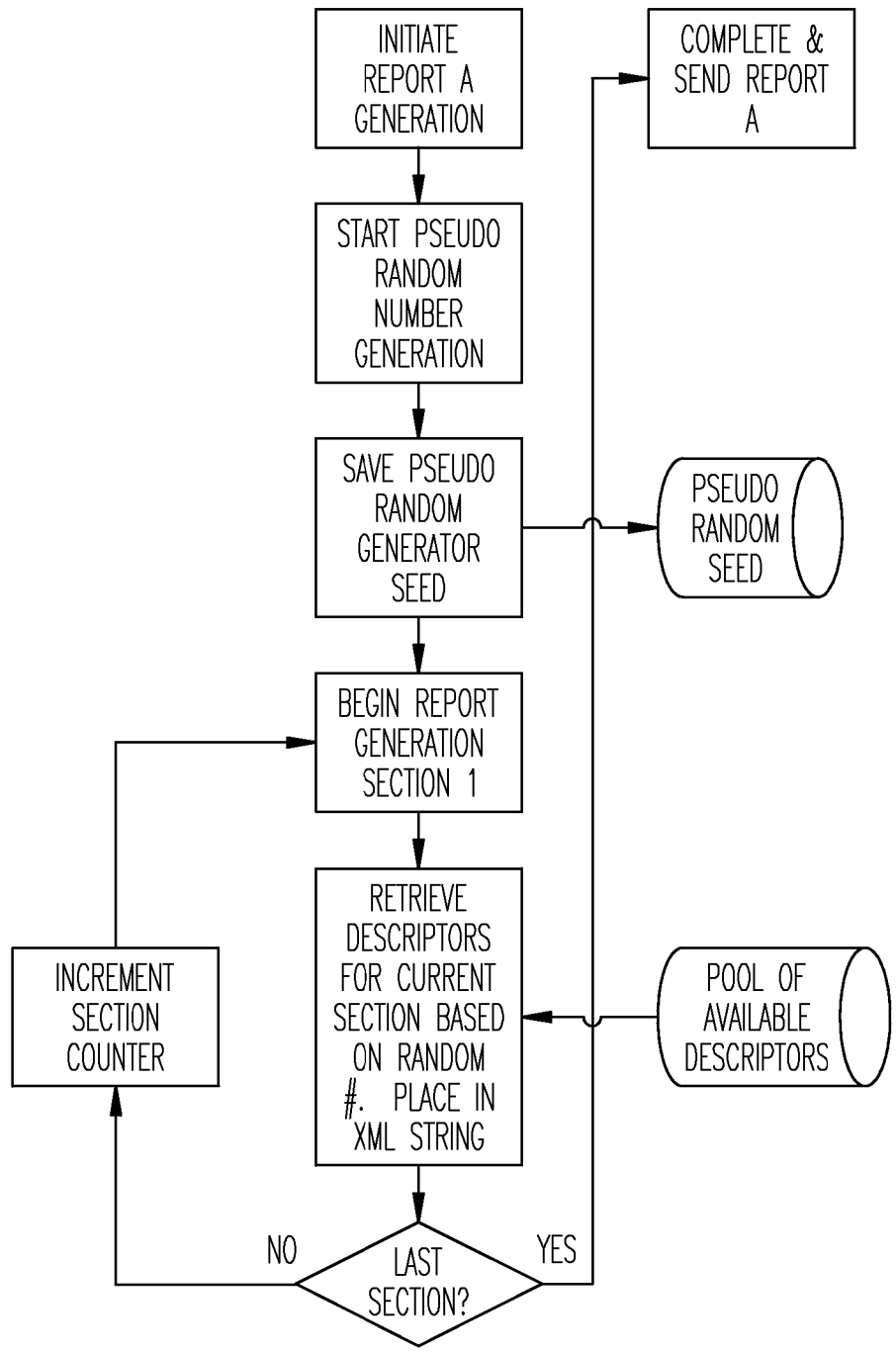
Fig.1B1

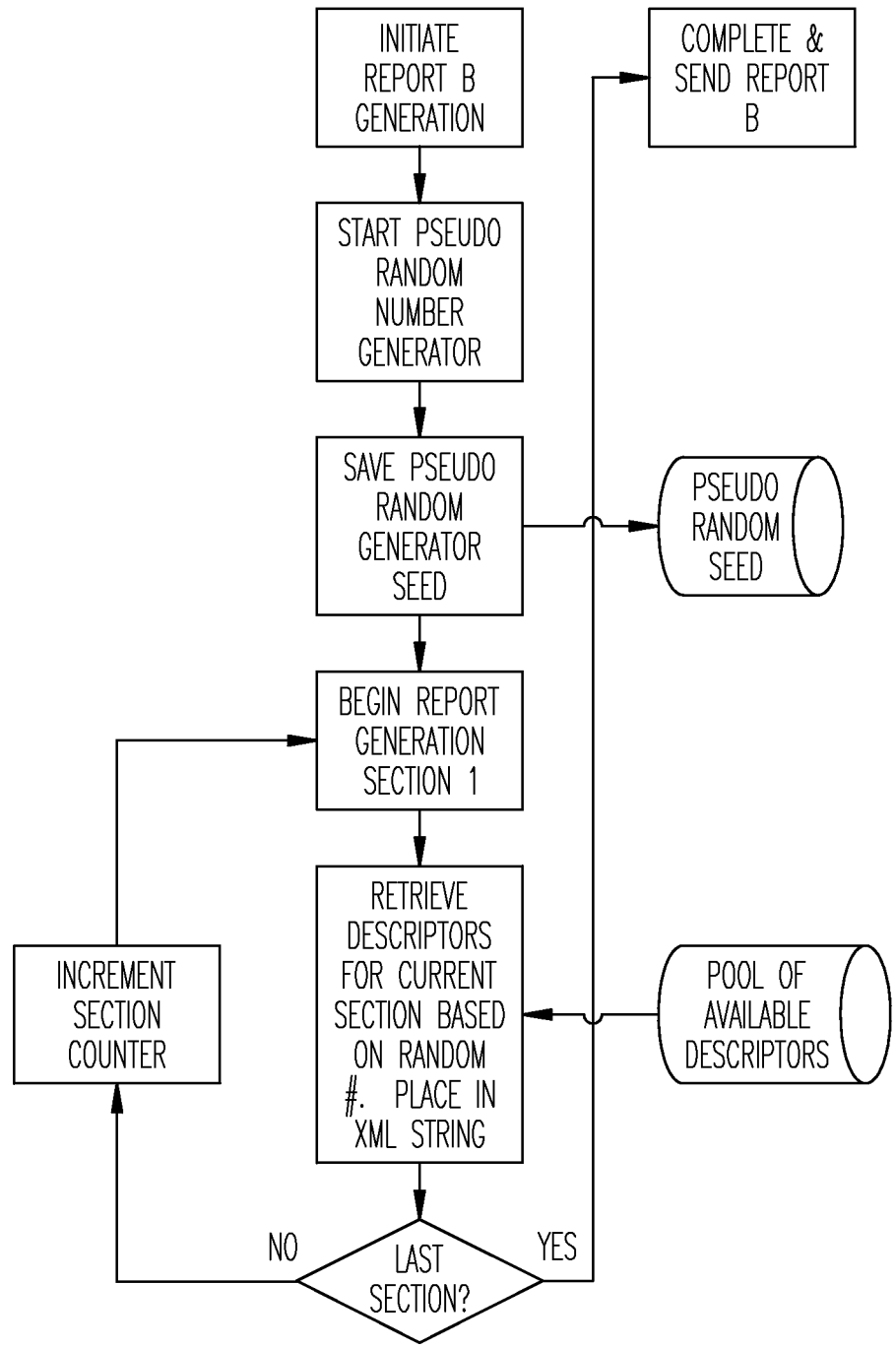
Fig. 1B2

ENERGY LEVEL
TENDENCY TO DISPLAY ENDURANCE AND CAPACITY FOR A FAST PACE.

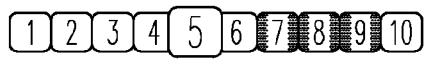

BEHAVIORAL CONSIDERATIONS

210 { MR. CANDIDATE 1 ACHIEVED AN ENERGY LEVEL SCORE THAT IS OUTSIDE THE DESIGNATED PROFILE FOR THIS PERFORMANCE MODEL. THIS SUGGESTS THAT HIS WORK PACE IS NOT AT THE LEVEL THE POSITION TYPICALLY REQUIRES. DISCUSSIONS WITH HIM SHOULD EXPLORE THE POSSIBILITY THAT FOR MR. CANDIDATE 1, THE POSITION MAY BE TOO CHALLENGING AND COULD LEAD TO FRUSTRATION AND A REDUCTION IN HIS LEVEL OF PERFORMANCE.

INTERVIEW QUESTIONS

- WHAT KIND OF EXPERIENCES HAVE YOU HAD INVOLVING MULTIPLE PROJECTS? HOW DO YOU TYPICALLY COPE WITH SUCH A SITUATION?
  INTERVIEWER'S NOTES

- HOW DO YOU HANDLE THE STRESS WHEN WORK DEMANDS ARE HIGH AND DEADLINES PRESS YOU TO WORK LONG HOURS?
  INTERVIEWER'S NOTES

- TELL ME ABOUT A TIME WHEN YOU HAD TO CHOOSE BETWEEN PERSONAL PRIORITIES AND UNUSUAL WORK DEMANDS.
  INTERVIEWER'S NOTES

- WE ALL HAVE TO MAKE DECISIONS ON THE JOB ABOUT THE DELICATE BALANCE BETWEEN PERSONAL AND WORK OBJECTIVES. WHEN HAVE YOU FELT YOU HAD TO MAKE PERSONAL SACRIFICES IN ORDER TO GET THE JOB DONE?
  INTERVIEWER'S NOTES

*Fig.2*

ENERGY LEVEL
TENDENCY TO DISPLAY ENDURANCE AND CAPACITY FOR A FAST PACE.

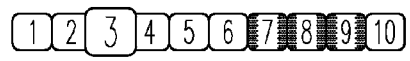

BEHAVIORAL CONSIDERATIONS

220 { ON THE ENERGY LEVEL SCALE, MR. CANDIDATE 2 IS BELOW THE PERFORMANCE MODEL FOR THIS SALES POSITION. THIS SUGGESTS THAT HE MAY NOT POSSESS THE ENERGY TO ADAPT TO YOUR SALES ENVIRONMENT. DISCUSSIONS WITH HIM SHOULD EXPLORE THE POSSIBILITY THAT FOR HIM THIS SALES ENVIRONMENT MAY DEMAND MORE INTENSITY AND DRIVE THAN HE WOULD BE SATISFIED MAINTAINING.

INTERVIEW QUESTIONS

- WHAT KIND OF EXPERIENCES HAVE YOU HAD INVOLVING MULTIPLE SALES ACCOUNTS? HOW DO YOU PREFER TO COPE WITH THE STRESS OF SUCH A SITUATION?
  INTERVIEWER'S NOTES

- WE ALL HAVE TO MAKE DECISIONS ON THE JOB ABOUT THE DELICATE BALANCE BETWEEN PERSONAL AND WORK OBJECTIVES. WHEN HAVE YOU FELT YOU HAD TO MAKE PERSONAL SACRIFICES IN ORDER TO GET THE JOB DONE?
  INTERVIEWER'S NOTES

- GIVE ME AN EXAMPLE OF ANY SPECIFIC TIME WHEN YOU FOUND IT NECESSARY TO GIVE LONG HOURS TO GET THE SALE CLOSED AND HOW YOU COPED WITH THE EFFECT ON YOUR ABILITY

INTERVIEWER'S NOTES

- TELL ME ABOUT A TIME WHEN YOU HAD TO COPE WITH STRICT DEADLINES OR TIME DEMANDS. GIVE ME AN EXAMPLE.
  INTERVIEWER'S NOTES

*Fig. 2A*

SYSTEM AND METHOD FOR EMBEDDING REPORT DESCRIPTORS INTO AN XML STRING TO ASSURE REPORT CONSISTENCY

RELATED APPLICATIONS

This application claims the benefit of and priority to U.S. Provisional Application No. 61/784,054, filed on Mar. 14, 2013, entitled "System And Method For Embedding Report Descriptors Into An XML String To Assure Report Consistency," which is hereby incorporated by reference in its entirety for all purposes. The present disclosure is related to U.S. patent application Ser. No. 13/107,176, entitled System For Selecting Employment Candidates, which was filed on May 13, 2011, and which is hereby incorporated by reference in its entirety for all purposes.

TECHNICAL FIELD

The present disclosure relates to a system and method for embedding report descriptors into an XML string, and in an embodiment, but not by way of limitation, embedding such descriptors into an XML string to assure report consistency.

BACKGROUND

In many instances, current systems used in job candidate or employee evaluation processes generate reports on the employees and/or job candidates. When different reports are generated for different persons or groups of persons, the different reports on the same employee or same job candidate can differ in form and content. At times this may be intentional and desired, while at other times it may be unintentional, undesired, and cause confusion.

The art is therefore in need of a system that can more accurately and effectively identify persons who are likely to excel in a particular job or a particular occupation, and a system of generating assessment reports for current employees or job candidates that are accurate and consistent across differing report types and report recipients.

BRIEF DESCRIPTION OF THE DRAWINGS

FIGS. 1A1, 1A2, 1A3, and 1A4 are a block diagram illustrating operations and features of a process and system for embedding report descriptors into an XML string to assure consistency among different types of reports.

FIGS. 1B1 and 1B2 are a block diagram illustrating operations and features of a process and system for generating reports using a random number seed and random number generator.

FIGS. 2 and 2A illustrate example report construct descriptors.

FIG. 3 is an example embodiment of a computer system upon which one or more embodiments of the present disclosure can execute.

DETAILED DESCRIPTION

Figure 1C:
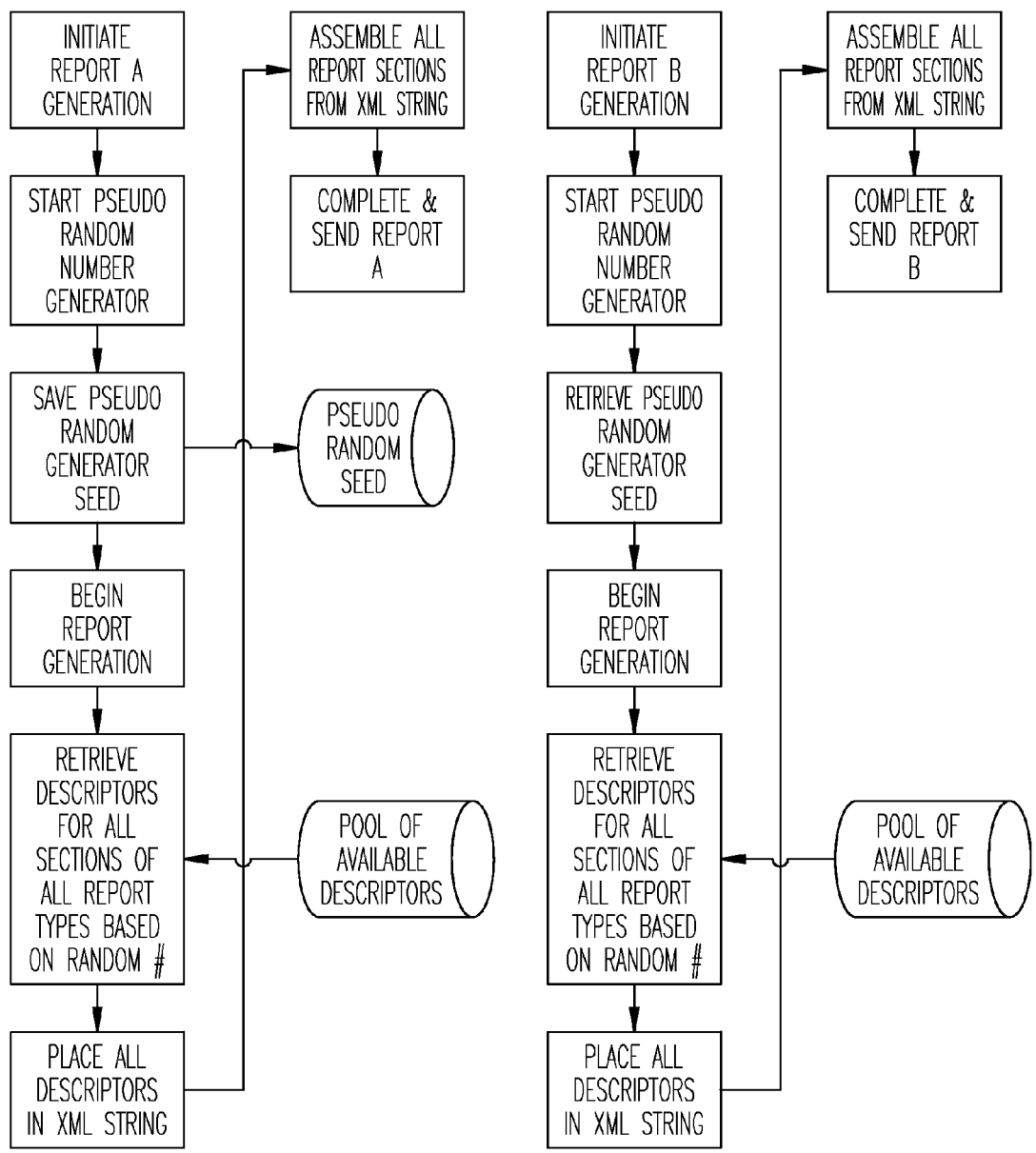
FIG. 1C is a block diagram illustrating operations and features of a process and system for embedding report descriptors into an XML string to assure consistency among different types of reports.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

When completing an assessment of a person for employment or other reasons, there may be a number of different reports available for various specific uses and/or for different persons or groups of people (i.e., those who will read and use the report). For example, the intended recipients of a report may include a particular individual, a particular position (e.g., hiring manager), and/or a particular company department (e.g., human resources or engineering). Additionally, different reports may be generated with different purposes in mind. For example, a report may be generated for use in connection with coaching/training an employee, or a report may be generated for use as an interview guide in connection with interviewing a job candidate.

In an embodiment, these reports are based on the scores of the individual employee or candidate across a number of different constructs (or traits). These reports may also include a number of different descriptors. FIGS. 2 and 2A illustrate examples of descriptors.

In an embodiment, to support the creation and assembly of these various reports, the computer system stores a super set of descriptors in a database. This superset of descriptors contains all of the descriptors that could possibly be used for all of the constructs in all of the reports. A subset of these descriptors is selected for inclusion in any particular report (on a particular job candidate or other individual). This subset selection is driven by a pseudo random number generator. The random number selection process is used to avoid rote displays of descriptors in reports for different individuals. For example, in FIG. 2, the report for Mr. Candidate 1 includes a descriptor 210 for Mr. Candidate 1's energy level. For a report for a different individual, as illustrated in FIG. 2A, such as Mr. Candidate 2, the report may include a different descriptor 220 for Mr. Candidate 2's energy level.

At the beginning of report generation for a particular individual, the seed for the pseudo random number generator is saved in a database so that subsequent report requests for this particular individual can utilize the initial seed and therefore make the same subset selection of descriptors for this particular person as was selected in the first report generation. When a different report type is selected for this particular person, the generation process can be repeated with a new pseudo random number seed, so that in sections of the second report type, the descriptors for the same construct may be different than those in the first report type. However, this may cause confusion with the people who read and use the reports. For example, if the users of the reports have copies of the various report types and compare them, they may be confused if a first report type has one descriptor for a report section and a second report type has another different descriptor for the same report section. In such systems, even if the same pseudo random number seed were used for both report type one and report type two, the descriptors selected may not match because there may be a different number of steps for the two different reports and the various sections of the reports, and therefore the pseudo random number would be advanced to a different value when the selection process was executed. This process is depicted in FIGS. 1B1 and 1B2.

To overcome the issues with report generation, in an embodiment, a computer system and storage mechanism contain a repository of construct descriptors. The number of descriptors exceeds the number of descriptors that are required for reporting on any specific report. The computer system also includes a software-implemented pseudo random number generator. The random number generator is used in selecting a subset of descriptors from the descriptor repository. The pseudo random number generator seed is stored in a storage device in the computer system so that the specific selection process can be repeated at a future time. Once the descriptor selection process is initiated, the descriptors for all report types are selected and placed in a string of data, such as an XML string. Thereafter, a report generation process traverses the XML string and chooses the appropriate descriptors for the active report type. A block diagram illustrating this process for this type of report generation is shown in FIG. 1C.

FIGS. 1A1, 1A2, 1A3, and 1A4 are a flowchart-like diagram of features and steps of an example system and process for embedding report descriptors into an XML string, another string of data, or other data construct so as to ensure report consistency among different types of reports. FIGS. 1A1, 1A2, 1A3, and 1A4 include a number of process blocks 105-162. Though arranged substantially serially in the example of FIGS. 1A1, 1A2, 1A3, and 1A4, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

At 105, a plurality of report construct descriptors are stored and maintained in a computer storage device in a computer system. The report construct descriptors are for use in a plurality of sections in a plurality of reports generated by the system. As noted above, examples of such report construct descriptors are illustrated in FIGS. 2 and 2A. The reports include a report type and a report subject. At 106, the report subject includes an assessment of a particular individual, and at 107, the assessment of the particular individual is related to an employment assessment. At 109, the report type includes a report for a particular department of a business organization, a particular person in the business organization, a particular group of people within the business organization, or for use in connection with a particular purpose in the business organization.

At 110, a pseudo random number seed is generated. The pseudo random number generator seed is used for selecting a first subset of the report construct descriptors for the plurality of reports on a first report subject. At 115, the pseudo random number seed is stored in the computer storage device. At 120, the first subset of report construct descriptors for the plurality of reports on the first report subject is retrieved. The retrieval is based on the pseudo random number seed and also on subsequently generated random numbers. The generation of the subsequent random numbers is based on the pseudo random number. At 125, the retrieved first subset of report construct descriptors is placed into an XML string. Data structures other than an XML string could be used, such as a simple ASCII string of data. At 130, two or more reports relating to the first report subject are generated using the first subset of report construct descriptors in the XML string. At 135, the two or more reports include at least two different report types, and at 137, each common section among the two or more reports includes the same report construct descriptors.

At 140, a second pseudo random number seed is generated for use in selecting a second subset of the report construct descriptors for a plurality of reports on a second report subject. At 141, the second pseudo random number seed is stored in the computer storage device for use in generating one or more of the plurality of reports on the second report subject at a later time. The later time could be as little as substantially immediately after generating a first report on the second report subject or several minutes after generating the first report on the second report subject, or the later time could be days, weeks, or months after generating the first report on the second report subject. At 142, the second subset of report construct descriptors is retrieved based on the second pseudo random number seed and a second set of subsequently generated random numbers. At 143, the retrieved second subset of report construct descriptors is placed into the XML string. At 144, two or more reports relating to the second report subject are generated using the second subset of report construct descriptors in the XML string. At 145, the two or more reports relating to the second report subject include at least two different report types. At 146, each common section among the two or more reports includes the same report construct descriptors. At 147, the first subset of report construct descriptors for the first report subject is different than the second subset of report constructors for the second report subject. This feature permits the reporting and assessment system to report on similar attributes of two report subjects, such as a candidate's energy level as reported in FIGS. 2 and 2A, in a more varietal and less monotonous manner.

At 150, the placement of the retrieved first subset of report construct descriptors into the XML string includes marking the first subset of report construct descriptors with an identifier. The identifier includes the first report subject and one or more report sections. At 152, the generation of the first type of report relating to the first report subject uses the identifier to identify the one or more report section constructs to populate the first report subject.

At 155, the plurality of reports on a first report subject includes all sections and all report types.

At 160, the pseudo random number seed stored in the computer storage device is for use in generating one or more of the plurality of reports on the first report subject at a later time. As noted above, the later time could be as little as substantially immediately after generating a first report on the first report subject or several minutes after generating the first report on the first report subject, or the later time could be days, weeks, or months after generating the first report on the first report subject. At 162, the generation of one or more of the plurality of reports on the first report subject at a later time includes generating at least one report of a different type relating to the first report subject using the first subset of report construct descriptors in the XML string, such that common sections of the plurality of reports and the at least one report of a different report type include the same report construct descriptors. This feature permits consistency among the plurality of reports for the same report subject, such that a report on an employee's or candidate's energy level will contain the same description in a report generated for the human resources department, the plant operations department, or the purchasing department. Consequently, if a person sees more than one of the reports for a particular employee or candidate, this person will not be confused by different descriptions for the same attribute for the same employee or candidate.

Figure 3:
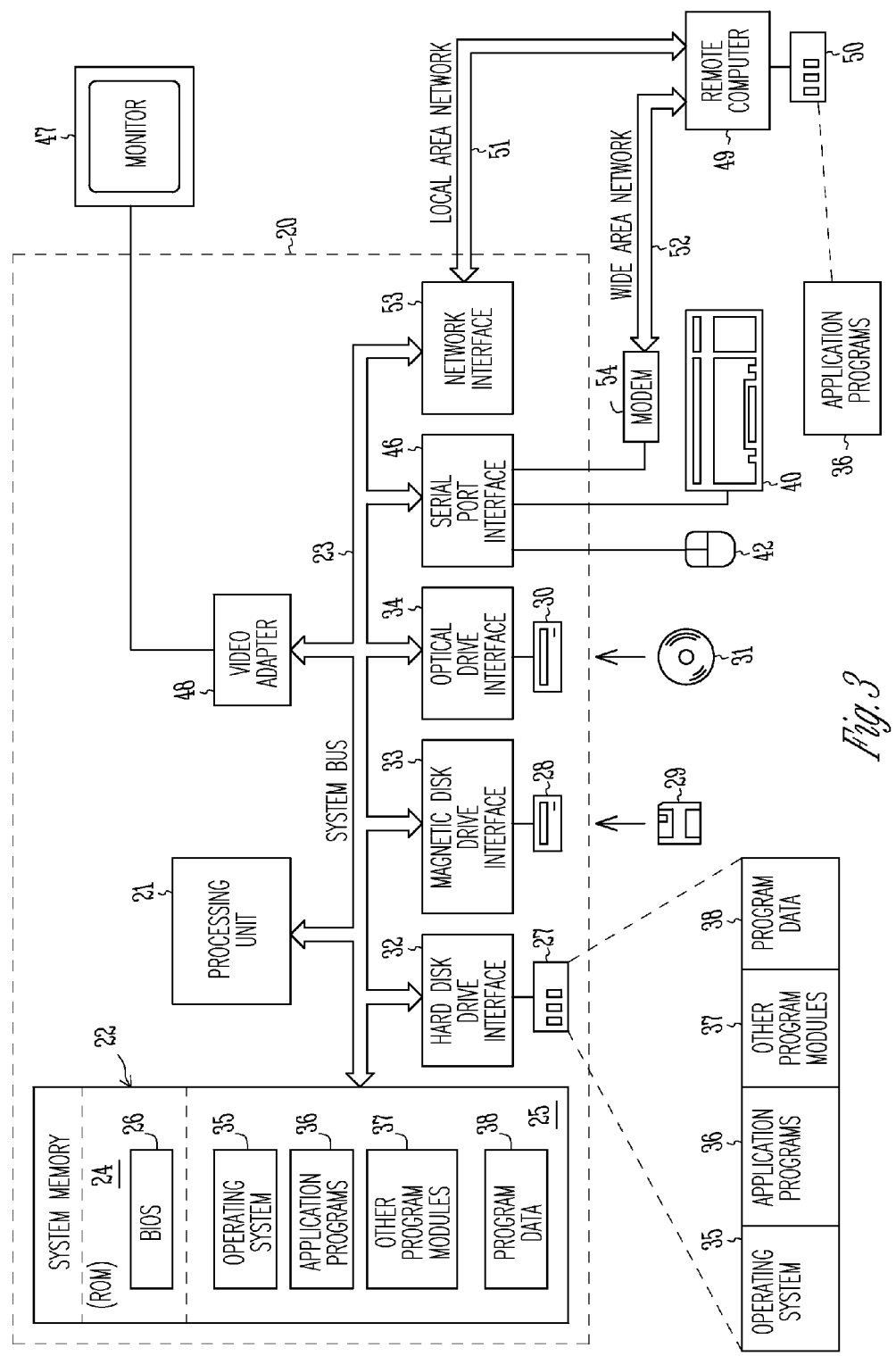

FIG. 3 is an overview diagram of hardware and an operating environment in conjunction with which embodiments of the invention may be practiced. The description of FIG. 3 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/0 remote processing devices that are linked through a communications network. In a distributed computing environment, program modules may be located in both local and remote memory storage devices.

In the embodiment shown in FIG. 3, a hardware and operating environment is provided that is applicable to any of the servers and/or remote clients shown in the other Figures.

As shown in FIG. 3, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 3 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
a computer processor and computer storage device operable to:
store and maintain a plurality of report construct descriptors, the report construct descriptors for use in a plurality of sections in a plurality of reports generated by the system, the reports comprising a report type and a report subject;
generate a pseudo random number seed for use in selecting a first subset of the report construct descriptors for the plurality of reports on a first report subject;
store the pseudo random number seed in the computer storage device;
retrieve the first subset of report construct descriptors for the plurality of reports on the first report subject based on the pseudo random number seed and subsequently generated random numbers;
place the retrieved first subset of report construct descriptors into an XML string; and
generate two or more reports relating to the first report subject using the first subset of report construct descriptors in the XML string;
wherein the two or more reports comprise at least two different report types, and wherein each common section among the two or more reports comprises the same report construct descriptors;
wherein the placing of the retrieved first subset of report construct descriptors into the XML string comprises marking the first subset of report construct descriptors with an identifier comprising the first report subject and one or more report section constructs; and
wherein generation of a first type of report relating to the first report subject uses the identifier to identify the one or more report section constructs to populate the first report subject.

2. The system of claim 1, wherein the computer processor and computer storage device are operable to:
generate a second pseudo random number seed for use in selecting a second subset of the report construct descriptors for a plurality of reports on a second report subject;
store the second pseudo random number seed in the computer storage device for use in generating one or more of the plurality of reports on the second report subject at a later time;
retrieve the second subset of report construct descriptors based on the second pseudo random number seed and a second set of subsequently generated random numbers;
place the retrieved second subset of report construct descriptors into the XML string; and
generate two or more reports relating to the second report subject using the second subset of report construct descriptors in the XML string;
wherein the two or more reports relating to the second report subject comprise at least two different report types, and wherein each common section among the two or more reports comprises the same report construct descriptors; and
wherein the first subset of report constructor descriptors for the first report subject is different than the second subset of report constructor descriptors for the second report subject.

3. The system of claim 1, wherein the report subject comprises an assessment of a particular individual.

4. The system of claim 3, wherein the assessment of the individual is related to an employment assessment.

5. The system of claim 1, wherein the report type comprises a report for a particular department of a business organization, a particular person in the business organization, or a particular group of people in the business organization.

6. The system of claim 1, wherein the plurality of reports on a first report subject comprises all sections and all report types.

7. The system of claim 1, wherein the pseudo random number seed stored in the computer storage device is for use in generating one or more of the plurality of reports on the first report subject at a later time.

8. The system of claim 7, wherein the generation of one or more of the plurality of reports on the first report subject at a later time comprises generating at least one report of a different type relating to the first report subject using the first subset of report construct descriptors in the XML string, such that common sections of the plurality of reports and the at least one report of a different report type comprise the same report construct descriptors.

9. A method comprising:
storing and maintaining in a computer storage device a plurality of report construct descriptors, the report construct descriptors for use in a plurality of sections in a plurality of reports, the reports comprising a report type and a report subject;
generating a pseudo random number seed for use in selecting a first subset of the report construct descriptors for the plurality of reports on a first report subject;
storing the pseudo random number seed in the computer storage device;
retrieving the first subset of report construct descriptors for the plurality of reports on the first report subject based on the pseudo random number seed and subsequently generated random numbers;

placing the retrieved first subset of report construct descriptors into an XML string; and generating two or more reports relating to the first report subject using the first subset of report construct descriptors in the XML string;

wherein the two or more reports comprise at least two different report types, and wherein each common section among the two or more reports comprises the same report construct descriptors;

wherein the placing of the retrieved first subset of report construct descriptors into the XML string comprises marking the first subset of report construct descriptors with an identifier comprising the first report subject and one or more report section constructs; and wherein generation of a first type of report relating to the first report subject uses the identifier to identify the one or more report section constructs to populate the first report subject.

10. The method of claim 9, comprising:

generating a second pseudo random number seed for use in selecting a second subset of the report construct descriptors for a plurality of reports on a second report subject;

storing the second pseudo random number seed in the computer storage device for use in generating one or more of the plurality of reports on the second report subject at a later time;

retrieving the second subset of report construct descriptors based on the second pseudo random number seed and a second set of subsequently generated random numbers;

placing the retrieved second subset of report construct descriptors into the XML string; and generating two or more reports relating to the second report subject using the second subset of report construct descriptors in the XML string;

wherein the two or more reports relating to the second report subject comprise at least two different report types, and wherein each common section among the two or more reports comprises the same report construct descriptors; and wherein the first subset of report construct descriptors for the first report subject is different than the second subset of report constructor descriptors for the second report subject.

11. The method of claim 9, wherein the report subject comprises an assessment of a particular individual; and wherein the assessment of the individual is related to an employment assessment.

12. The method of claim 9, wherein the report type comprises a report for a particular department of a business organization, a particular person in the business organization, or a particular group of people in the business organization.

13. The method of claim 9, wherein the plurality of reports on a first report subject comprises all sections and all report types.

14. The method of claim 9, wherein the pseudo random number seed stored in the computer storage device is for use in generating one or more of the plurality of reports on the first report subject at a later time; and wherein the generation of one or more of the plurality of reports on the first report subject at a later time comprises generating at least one report of a different type relating to the first report subject using the first subset of report construct descriptors in the XML string, such that common sections of the plurality of reports and the at least one report of a different report type comprise the same report construct descriptors.

15. A computer readable storage device comprising instructions that when executed by a processor execute a process comprising:

storing and maintaining in a computer storage device a plurality of report construct descriptors, the report construct descriptors for use in a plurality of sections in a plurality of reports, the reports comprising a report type and a report subject;

generating a pseudo random number seed for use in selecting a first subset of the report construct descriptors for the plurality of reports on a first report subject;

storing the pseudo random number seed in the computer storage device;

retrieving the first subset of report construct descriptors for the plurality of reports on the first report subject based on the pseudo random number seed and subsequently generated random numbers that are generated as a function of the pseudo random number seed;

placing the retrieved first subset of report construct descriptors into an XML string; and generating two or more reports relating to the first report subject using the first subset of report construct descriptors in the XML string;

wherein the two or more reports comprise at least two different report types, and wherein each common section among the two or more reports comprises the same report construct descriptors;

wherein the placing of the retrieved first subset of report construct descriptors into the XML string comprises marking the first subset of report construct descriptors with an identifier comprising the first report subject and one or more report section constructs; and wherein generation of a first type of report relating to the first report subject uses the identifier to identify the one or more report section constructs to populate the first report subject.

16. The computer readable storage device of claim 15, comprising instructions for:

generating a second pseudo random number seed for use in selecting a second subset of the report construct descriptors for a plurality of reports on a second report subject;

storing the second pseudo random number seed in the computer storage device for use in generating one or more of the plurality of reports on the second report subject at a later time;

retrieving the second subset of report construct descriptors based on the second pseudo random number seed and a second set of subsequently generated random numbers;

placing the retrieved second subset of report construct descriptors into the XML string; and generating two or more reports relating to the second report subject using the second subset of report construct descriptors in the XML string;

wherein the two or more reports relating to the second report subject comprise at least two different report types, and wherein each common section among the two or more reports comprises the same report construct descriptors; and wherein the first subset of report construct descriptors for the first report subject is different than the second subset of report construct descriptors for the second report subject.

17. The computer readable storage device of claim 15, wherein the pseudo random number seed stored in the computer storage device is for use in generating one or more of the plurality of reports on the first report subject at a later time; and wherein the generation of one or more of the plurality of reports on the first report subject at a later time comprises generating at least one report of a different type relating to the first report subject using the first subset of report construct descriptors in the XML string, such that common sections of the plurality of reports and the at least one report of a different report type comprise the same report construct descriptors.

\* \* \* \* \*